(12) United States Patent
Lin et al.

(10) Patent No.: US 10,786,822 B2
(45) Date of Patent: Sep. 29, 2020

(54) THIN SHOWER HEAD AND WATERWAY SWITCHING DEVICE

(71) Applicant: XIAMEN SOLEX HIGH-TECH INDUSTRIES CO., LTD., Xiamen (CN)

(72) Inventors: Fengde Lin, Xiamen (CN); Mingfu Zhang, Xiamen (CN); Tianming Wang, Xiamen (CN); Wenxing Chen, Xiamen (CN)

(73) Assignee: XIAMEN SOLEX HIGH-TECH INDUSTRIES CO., LTD., Xiamen, Fujian Province (CN)

( * ) Notice: Subject to any disclaimer, the term of this patent is extended or adjusted under 35 U.S.C. 154(b) by 110 days.

(21) Appl. No.: 16/160,124

(22) Filed: Oct. 15, 2018

(65) Prior Publication Data
US 2019/0283049 A1 Sep. 19, 2019

(30) Foreign Application Priority Data

Mar. 19, 2018 (CN) .......................... 2018 1 0225113
Mar. 19, 2018 (CN) ..................... 2018 2 0372985 U

(51) Int. Cl.
*B05B 1/18* (2006.01)
*B05B 1/16* (2006.01)
(Continued)

(52) U.S. Cl.
CPC .............. *B05B 1/18* (2013.01); *B05B 1/1609* (2013.01); *B05B 1/1663* (2013.01);
(Continued)

(58) Field of Classification Search
CPC ....... B05B 1/18; B05B 1/1609; B05B 1/1663; B05B 1/1672; B05B 12/02; E03C 1/0409;
(Continued)

(56) References Cited

U.S. PATENT DOCUMENTS 9,550,195 B1 * 1/2017 Cao ........................... B05B 1/18
2012/0012676 A1 1/2012 Hu
(Continued)

FOREIGN PATENT DOCUMENTS

CN 206009031 U 3/2017

OTHER PUBLICATIONS

The EESR issued May 6,2019 by the EPO.

*Primary Examiner* — Steven J Ganey
(74) *Attorney, Agent, or Firm* — Yunling Ren

(57) ABSTRACT

This disclosure provides a thin shower head and a waterway switching device. The water switching device includes a body, a switching shaft disposed in the body and a driving mechanism. The body has a hollow portion and a water inlet end and a water outlet end. the water outlet end has two waterways in communication with the hollow portion. The switching shaft includes a water-division section located in the hollow portion and a traction section extending out of the water outlet end. The driving mechanism is disposed outside the body, for driving the switching shaft to reciprocate in an axial direction, such that the switching shaft is switched between at least two switching positions, wherein at least one waterway is opened correspondingly at each of the switching positions. The driving mechanism includes a driving member and a one-way rotational device for connecting the driving member to the switching shaft.

14 Claims, 14 Drawing Sheets

(51) Int. Cl.
  *F16K 31/528* (2006.01)
  *E03C 1/04* (2006.01)
  *F16K 31/53* (2006.01)
  *F16K 11/07* (2006.01)
  *B05B 12/02* (2006.01)
  *F16K 31/54* (2006.01)
  *E03C 1/02* (2006.01)

(52) U.S. Cl.
  CPC ............ *B05B 1/1672* (2013.01); *B05B 12/02* (2013.01); *E03C 1/0409* (2013.01); *F16K 11/07* (2013.01); *F16K 31/5286* (2013.01); *F16K 31/53* (2013.01); *F16K 31/54* (2013.01); *E03C 1/023* (2013.01)

(58) Field of Classification Search
  CPC ...... E03C 1/023; F16K 11/07; F16K 31/5286; F16K 31/53; F16K 31/54
  USPC ................ 239/443, 446, 525, 530, 583, 586
  See application file for complete search history.

(56) References Cited

U.S. PATENT DOCUMENTS

| | | |
|---|---|---|
| 2015/0115065 A1 | 4/2015 | Zhou et al. |
| 2017/0056896 A1* | 3/2017 | Lei ............................ B05B 1/12 |
| 2018/0001331 A1* | 1/2018 | Lin ...................... B05B 1/1663 |

* cited by examiner

THIN SHOWER HEAD AND WATERWAY SWITCHING DEVICE

CROSS REFERENCE

This application is based upon and claims priority to Chinese Patent Application No. 201810225113.X, filed on Mar. 19, 2018, the entire contents thereof are incorporated herein by reference.

TECHNICAL FIELD

The present disclosure relates to a thin shower head and a waterway switching device.

BACKGROUND

In daily life, a water valve such as a shower head or a faucet is always used to regulate output of the water flow. With the development of the water valve, some water valves include a plurality of waterways and may be switched between the plurality of waterways. As an example of the shower head, the shower head generally includes a handle and a nozzle. The nozzle is connected to one end of the handle, and the water inlet pipe may be in communication with the other end of the nozzle. The water may flow into the nozzle through the handle and ejected from a water outlet on the nozzle. At the same time, there are a plurality of waterways and switching device in the nozzle. The water flow may be switched between the different waterways by cooperation of the switching device in order to achieve the different water discharge functions.

However, if the switching device is provided in the nozzle, it is required to set a space for installing the switching device in the nozzle, which causes the size of the nozzle larger, and makes the internal structure of the nozzle too complicated to be maintained difficulty.

It should be noted that the Background portion contains the contents which are merely used to reinforce understanding of the background technology of the present disclosure, and thus may include information that does not constitute the prior art as already known by an ordinary person skilled in the art.

SUMMARY

According to one aspect of the present disclosure, a waterway switching device includes a body, a switching shaft and a driving mechanism. The body has a hollow portion and a water inlet end and a water outlet end, in which the water outlet end has at least two waterways in communication with the hollow portion. The switching shaft is disposed in the body and includes a water-division section located in the hollow portion and a traction section extending out of the water outlet end. The driving mechanism is disposed outside the body, for driving the switching shaft to reciprocate in an axial direction, such that the switching shaft is switched between at least two switching positions, wherein at least one waterway is opened correspondingly at each of the switching positions. The driving mechanism includes a driving member and a one-way rotational device for connecting the driving member to the switching shaft.

According to one embodiment of the present disclosure, the waterway switching device further includes a reciprocating moving part, and the driving member can be connected to the one-way rotational device by the reciprocating moving part.

According to one embodiment of the present disclosure, the at least two waterways are formed by at least two separate water pipes.

According to one embodiment of the present disclosure, the driving mechanism is disposed on the water pipe.

According to one embodiment of the present disclosure, a supporting portion is formed on the water outlet end of the body, and the driving mechanism is disposed on the supporting portion.

According to one embodiment of the present disclosure, the one-way rotational device includes a driving wheel and a driven wheel. The driving wheel that is connected to the reciprocating moving part and can be swung by driving of the reciprocating moving part, and an active ratchet being provided on the lower surface of the driving wheel. The driven wheel is disposed under the driving wheel, and a driven ratchet engaged with the active ratchet being disposed on an upper surface of the driven wheel. The driven wheel is rotated in one direction along with the rotation of the driving wheel, thereby driving the switching shaft to reciprocate.

According to one embodiment of the present disclosure, the one-way rotational device further includes a limit pawl disposed on the supporting portion, and a limit ratchet being provided at a periphery of the driven wheel, in which the limit pawl cooperates with the limit ratchet to block a reverse rotation of the driven wheel.

According to one embodiment of the present disclosure, the driven wheel is connected to the traction section, and the one-way rotational device further includes a gland and a positioning elastic member. The gland is disposed above the driving wheel and connected to the supporting portion. The positioning elastic member is disposed between the gland and the driving wheel, to apply a downward force to the driving wheel.

According to one embodiment of the present disclosure, the water-division section is positioned in the hollow portion. The traction section extends out of the water outlet end. The reciprocating moving part includes a slider. The slider is disposed on the supporting portion and capable to reciprocate linearly. The slider is defined with a driving slot. An active deadbolt fitted and protruded into the driving slot is provided on the upper surface of the driving wheel. And the slider can drive the driving wheel to reciprocate with a preset angle by cooperation of the driving slot and the deadbolt.

According to one embodiment of the present disclosure, the reciprocating moving part further includes a reset elastic member. The reset elastic member is disposed between the slider and the water outlet end, for applying a force to the slider away from the water outlet end.

According to one embodiment of the present disclosure, the preset angle is 90°.

According to one embodiment of the present disclosure, the waterway switching device further includes a linkage member for connecting the one-way rotational device and the traction section, the linkage member includes a top end portion and a connecting portion. The top end portion is disposed under the driven wheel. The top end portion is provided with a traction groove. The driven deadbolt is fitted and protruded into the traction groove is provided on the lower surface of the driven wheel. The driven wheel may drive the linkage member to reciprocate by cooperation of the driven deadbolt and the traction groove. The connecting portion is connected to the top end portion and connected to the traction section.

According to one embodiment of the present disclosure, the connecting portion includes two claws. The two snap slots symmetrically distributed are provided at the periphery of the traction section. And The two claws are engaged in the two snap slots.

According to one embodiment of the present disclosure, the linkage member further includes a guiding portion. The guiding portion is connected to the top end portion and located on one side of the connecting portion away from the water outlet end. The guiding portion includes two guide claws which are slidably matched with the supporting portion.

According to one embodiment of the present disclosure, the driving member includes a swing rod and a button. The swing rod has one end hinged to the supporting portion and the other end in contact with one end of the slider away from the water outlet end. The button may be hinged to the body and press the swing rod to move the slider toward the water outlet end.

According to one embodiment of the present disclosure, the driving member is a push button. The push button is slidably connected to the body, and the push button is connected to the slider and is synchronously movable.

According to one embodiment of the present disclosure, a thin shower head includes a handle and a nozzle positioned on one end of the handle. The handle is provided with the waterway switching device according to any one of claims. The waterway is in communication with the nozzle.

BRIEF DESCRIPTION OF THE DRAWINGS

The foregoing features, aspects and advantages of this disclosure will become more apparent from the following detailed description of this disclosure when taken in conjunction with the accompanying drawings.

Figure 1:
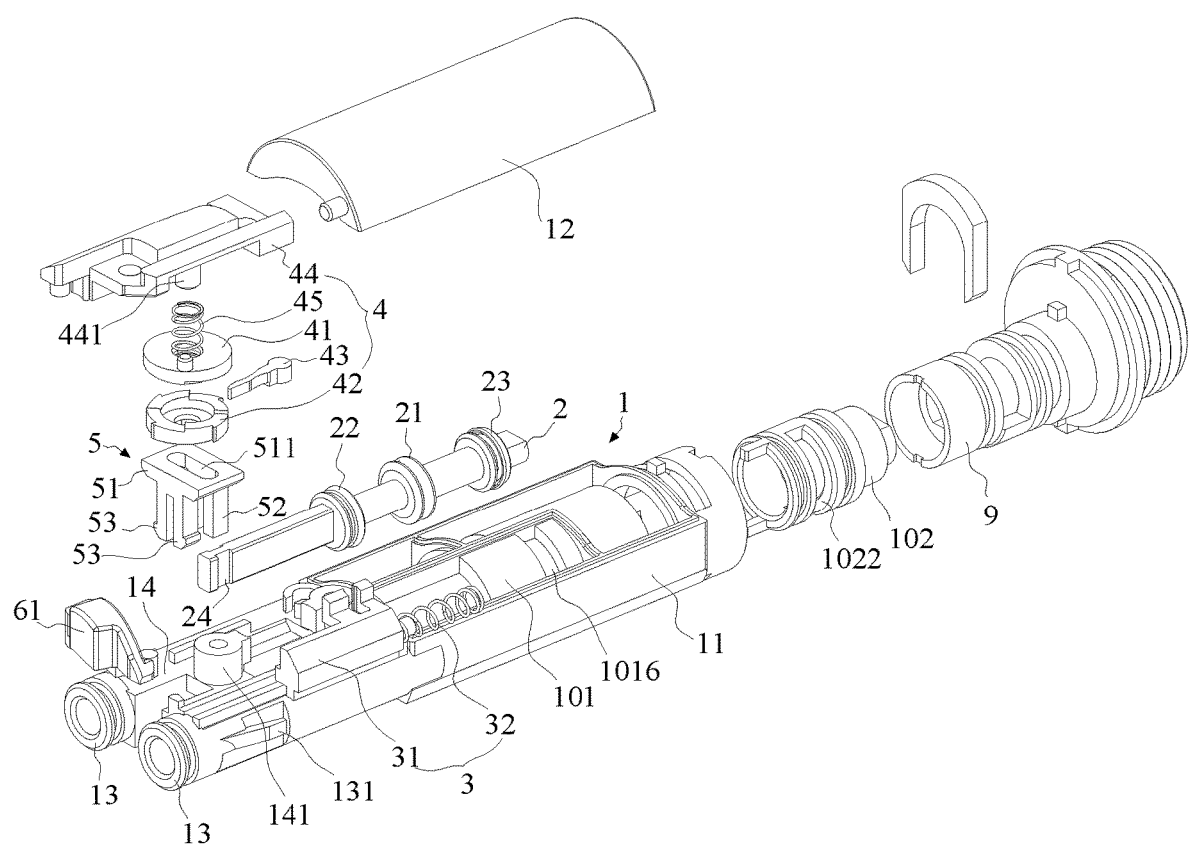
FIG. 1 is an exploded view of an embodiment of a waterway switching device of the present disclosure.

In the drawings, 1. body; 11, base; 111, vent; 12, cover plate; 13, waterway; 131, jaw; 14, supporting portion; 141, positioner; 101, valve housing; 102, valve body; 1021, first water hole; 1022, second water hole; 1011, water inlet chamber; 1012, first water outlet chamber; 1013, second water outlet chamber; 1014, water inlet; 1015, first water outlet; 1016, second water outlet; 1017, water-division chamber; 2, switching shaft; 201, chute; 21, switching collar; 22, first sealing collar; 23, second sealing collar; 24, snap slot; 3. reciprocating moving part; 31, slider; 311, driving slot; 32, reset elastic member; 4, one-way rotational device; 41, driving wheel; 411, active deadbolt; 412, active ratchet; 42, driven wheel; 421, driven ratchet; 422, driven deadbolt; 423, limit ratchet; 43, limit pawl; 44, gland; 441, positioning shaft; 45, positioning elastic member; 5, linkage member; 51, top end portion; 511, traction groove; 52, claw; 53, guide claw; 6, driving member; 61, swing rod; 611, torsion spring; 62, button; 7, handle; 8, nozzle; 9, joint.

DETAILED DESCRIPTION

Example embodiments will now be described more fully with reference to the accompanying drawings. However, the example embodiments can be implemented in various forms and should not be construed as limited to the embodiments set forth herein; rather, these embodiments are provided to render the present disclosure to be full and complete, and to fully convey the concept of the example embodiments to those skilled in the art. The same reference numerals in the drawings denote the same or similar structures, and thus their detailed description will be omitted.

The relativity words, such as "upper" or "lower", as used herein, are directed to describe the relative relationship of the referenced component to another component. These words are used herein for convenience only, for example, according to the direction of the illustrative examples as shown in the figures. It should be appreciated that if the referenced device is inversed upside down, the component indicated as being the "upper" side would become the component on the "lower" side. The other relativity words, such as "top" and "bottom" have the similar meaning. When one structure is "on" another structure, it is possible to indicate that the one structure is integrally formed on the other structure, or the one structure is "directly" arranged on the other structure, or one structure is "indirectly" formed on the other structure by cooperation of a further structure.

The terms "a", "an", "the" and "said", when describing element/constituent/or the like as described and/or shown herein, are used to express the presence of one or more the element/constitute/or the like. The terms "include", "comprise" and "have", as used herein, are intended to be inclusive, and mean there may be additional elements/constituents/or the like other than the listed elements/constituents/or the like. In addition, the words "first", "second", or the like, as used in claims, are meant to indication, but not to limit the object to which they modify.

An object of the present disclosure is to overcome the defects of the aforesaid existing art, a waterway switching device capable to switching a waterway is provided.

Another object of the present disclosure is to overcome the defects of the aforesaid existing art, a thin shower head capable to reduce size of a nozzle and facilitate for maintaining is provided.

An exemplary embodiment of the present disclosure provides a waterway switching device able to be used in shower heads, faucets or other water valves that enable waterway switching. Hereinafter, an example of the waterway switching device being only used in the shower heads, the shower head may include a handle and a nozzle, in which the nozzle may be connected to one end of the handle, and the other end of the handle may be connected to an inlet pipe.

As shown in FIG. 1 to FIG. 4, FIG. 1 to FIG. 4 show an embodiment of a waterway switching device of the present disclosure. The waterway switching device may include a body 1, a switching shaft 2, and a driving mechanism.

As shown in FIG. 1, in this embodiment, the body 1 may be formed by splicing a base 11 and a cover plate 12. The base 11 and the cover plate 12 may be detachably connected in a welding, snapping, or screw connecting manner. Meanwhile, the body 1 may have a hollow portion, and the body 1 may have a water inlet end and a water outlet end. The water inlet end may be provided with a joint 9 that may be connected to the water inlet pipe, and water in the water inlet pipe may flow into the hollow portion of the body 1 through the joint 9. The water outlet end may be communicated with two mutually independent waterways 13. The two waterways 13 may be two water pipes independent from each other. The water in the hollow portion may flow out of the body 1 through one of the two water pipes or by the two water pipes together. A supporting portion 14 may be formed on the outer side of the water outlet end of the body 1. The water pipe and the supporting portion 14 may be a one-piece structure. The supporting portion 14 may include two supporting bodies and two connecting bodies. The two supporting bodies are respectively formed on the surfaces of the two water pipes. The two connecting bodies are connected between the two supporting bodies, and an up-to-down breakthrough space is provided between the two connecting bodies. An outer wall of the water pipe may also be provided with a jaw 131, and may be matched with a groove in the handle through the jaw 131 after the water pipe is installed in the handle of the shower head, in order to secure the water pipe.

Of course, the water pipe and the supporting portion 14 may also be independent structures that may be connected by cooperation of snapping or the like, or the water pipe and the supporting portion 14 may be structures separate from one another. In other embodiments of the present disclosure, the number of the waterways 13 may be three or more. In this embodiment of the present disclosure, only two waterways 13 are taken as an example for description.

Figure 3:
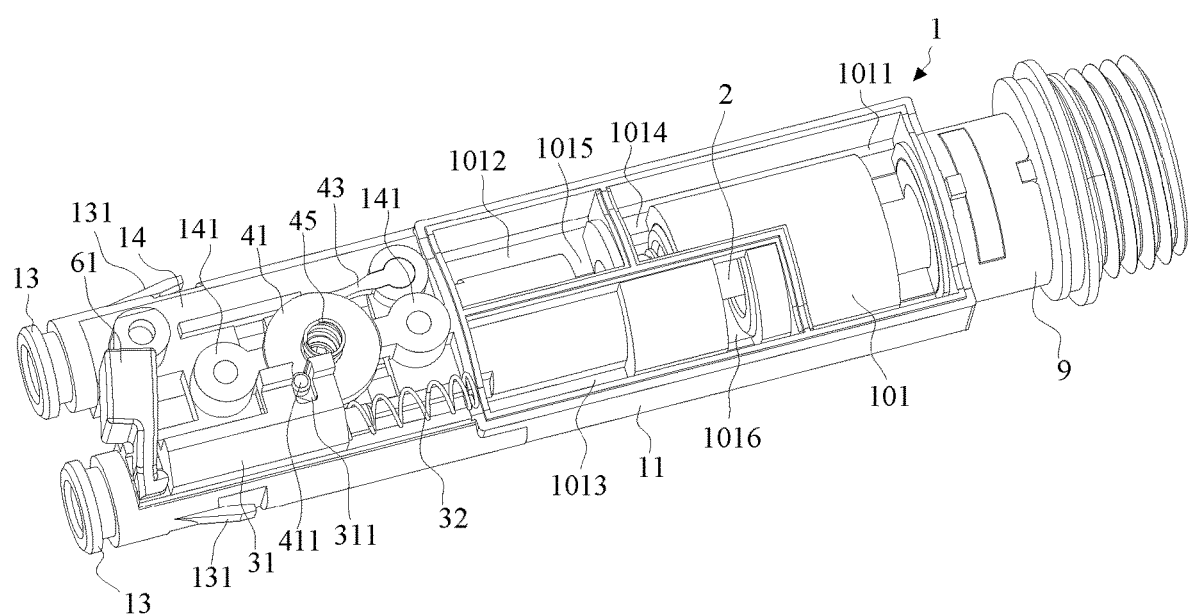
FIG. 3 is a schematic view of the interior of a body of the waterway switching device in FIG. 1.
Figure 6:
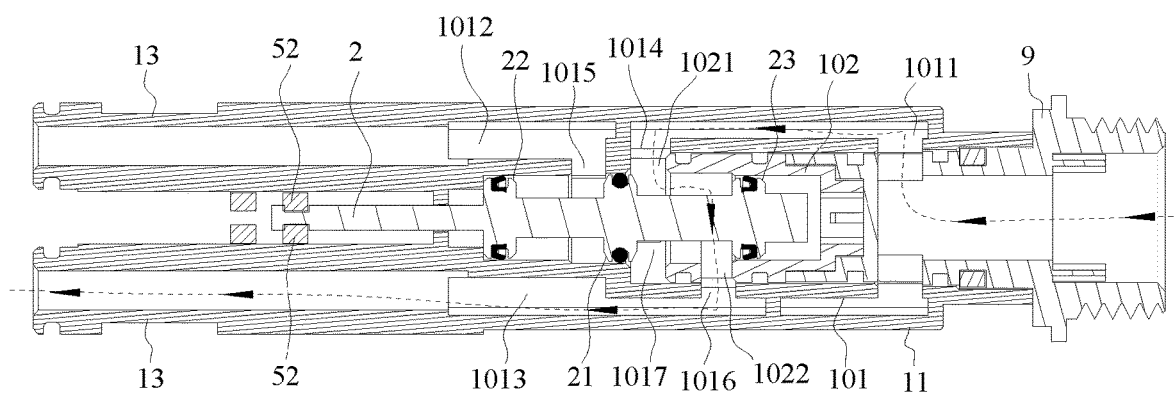
FIG. 6 is a schematic view showing that a switching shaft of the waterway switching device displaces in a first switching position in FIG. 1.

As shown in FIG. 3 and FIG. 6, a hollow valve housing 101 may be formed in the hollow portion of the body 1. The valve housing 101 has one end that may be connected with the inner surface of the water outlet end, and the other end that is close to the water inlet end and abuts against the joint 9 into one end of the body 1. A partition plate may be formed on an outer periphery of the valve housing 101 so that the hollow portion may be partitioned into a water inlet chamber 1011, a first water outlet chamber 1012, and a second water outlet chamber 1013 by the valve housing 101. One waterway 13 is in communication with the first water outlet chamber 1012 and the other waterway 13 is in communication with the second water outlet chamber 1013. At the same time, a water inlet 1014, a first water outlet 1015 and a second water outlet 1016 are provided on an outer periphery of the valve housing 101. The first water outlet 1015 is positioned at a side of the water inlet 1014 near the water outlet end, and the second water outlet 1016 is positioned at a side of the water inlet 1014 near the water inlet end. The water inlet 1014 is positioned in the water inlet chamber 1011, the first water outlet 1015 is positioned in the first water outlet chamber 1012, and the second water outlet 1016 is positioned in the second water outlet chamber 1013.

Figure 5:
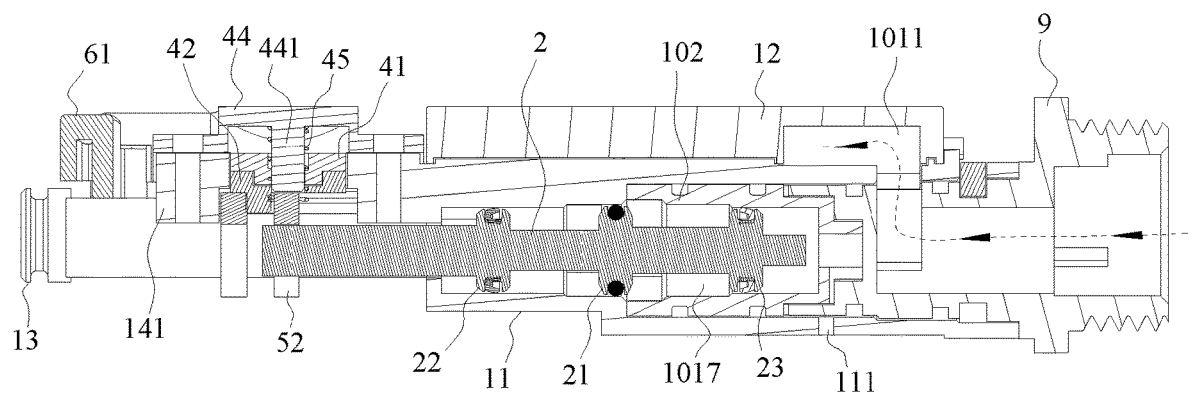
FIG. 5 is a cross-sectional view of the waterway switching device in FIG. 1.

As shown in FIG. 3 and FIG. 5, the valve housing 101 is provided with a valve body 102 that is perforated from one end to the other end. The valve housing 101 has an annular step formed therein. The valve body 102 has one end abutting against one side of the step near the water inlet 1014, and the other end abutting against the joint 9. The base 11 is provided with a vent 111, and the end of the valve body 102 near the water inlet end may communicate with an outdoor atmospheric pressure through the vent 111, to prevent the switching shaft 2 from being blocked by the air pressure as moving to the water inlet end, so that the switching shaft 2 moves smoothly. The first water hole 1021 and the second water hole 1022 are disposed at the periphery of the valve body 102. The first water hole 1021 is in direct communication with the water inlet 1014, and the second water hole 1022 is in direct communication with the second water outlet 1016. A space in the valve housing 101 positioned on the side of the step away from the water inlet end is perforated through the interior of the valve body 102 and forms a water-division chamber 1017. The water may flow into the water inlet chamber 1011 from the water inlet end and into the water-division chamber 1017 from the water inlet 1014. The water flowing into the water-division chamber 1017 may flow into the first water outlet chamber 1012 from the first water outlet 1015, or may flow into the second water outlet chamber 1013 from the second water outlet 1016.

As shown in FIG. 1, FIG. 5 to FIG. 6, in this embodiment, the switching shaft 2 may have a water-division section and a traction section. The water-division section may protrude into the hollow portion of the body 1 from the water outlet end of the body 1 and protrude into the water-division chamber 1017. The traction section may extend out of the water outlet end of the body 1. The switching shaft 2 may be linearly and reciprocatingly movable along its own axis by pulling the traction section of the switching shaft 2. A switching collar 21, a first sealing collar 22 and a second sealing collar 23 may formed at the periphery of the water-division section. The first sealing collar 22 is positioned on one side of the switching collar 21 near the traction section, and the second sealing collar 23 is positioned on the other side of the switching collar 21. The outer circumferences of the switching collar 21, the first sealing collar 22 and the second sealing collar 23 may be provided with a seal ring so as to slidably and hermetically cooperate with the inner wall surface of the water-division chamber 1017. In addition, a thickness of the switching collar 21 is less than a width of the water inlet 1014, so that the switching collar 21 cannot completely shield the water inlet 1014.

An illustrative description for the process of dividing water of the switching shaft 2 will be provided below.

As shown in FIG. 6, the first water outlet 1015 and the water inlet 1014 may be partitioned when the switching shaft 2 moves to the first switching position, and the switching collar 21 moves between the first water outlet 1015 and the water inlet 1014, at this time, the first water outlet 1015 is closed, the second water outlet 1016 is opened, and the water flowing into the water-division chamber 1017 from the water inlet chamber 1011 may be output to the second water outlet chamber 1013 only from the second water outlet 1016, and flows out of the corresponding waterway 13.

Figure 7:
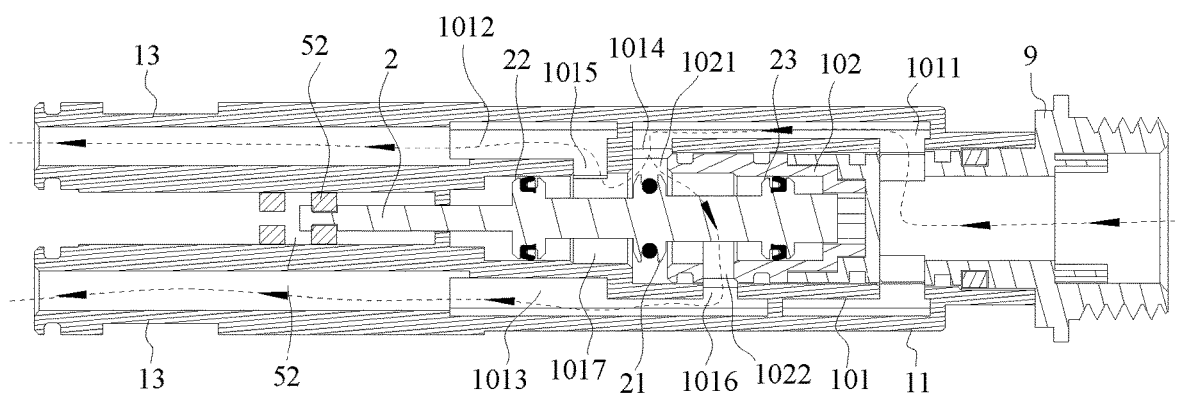
FIG. 7 is a schematic view showing that the switching shaft of the waterway switching device displaces in a second switching position in FIG. 1.

As shown in FIG. 7, the first water outlet 1015 and the second water outlet 1016 are simultaneously communicated with the water inlet 1014 when the switching shaft 2 moves to the second switching position, and the switching collar 21 moves to the position directly facing the water inlet 1014, at this time, the water flow may be output from both waterways 13.

Figure 8:
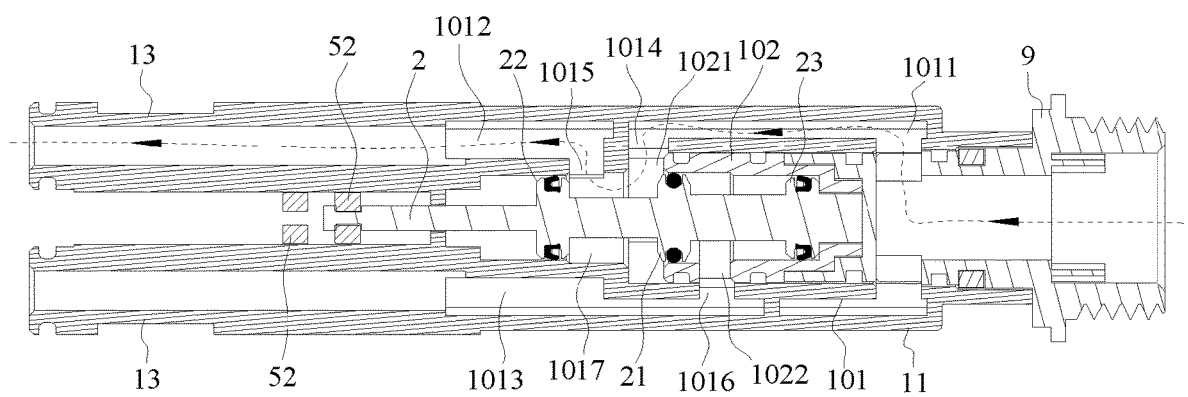
FIG. 8 is a schematic view showing that the switching shaft of the waterway switching device displaces in a third switching position in FIG. 1.
Figure 9:
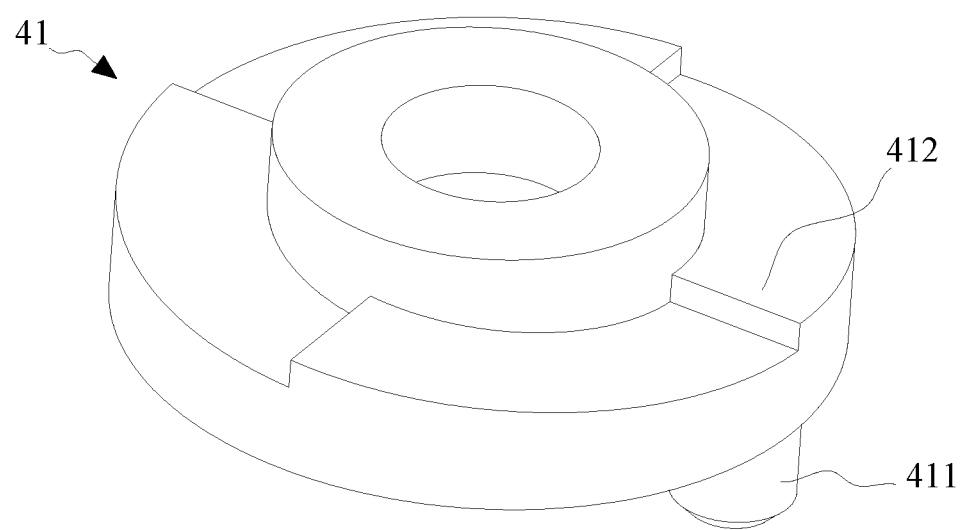
FIG. 9 is a schematic view of a driving wheel of an one-way rotational device of the waterway switching device in FIG. 1.
Figure 10:
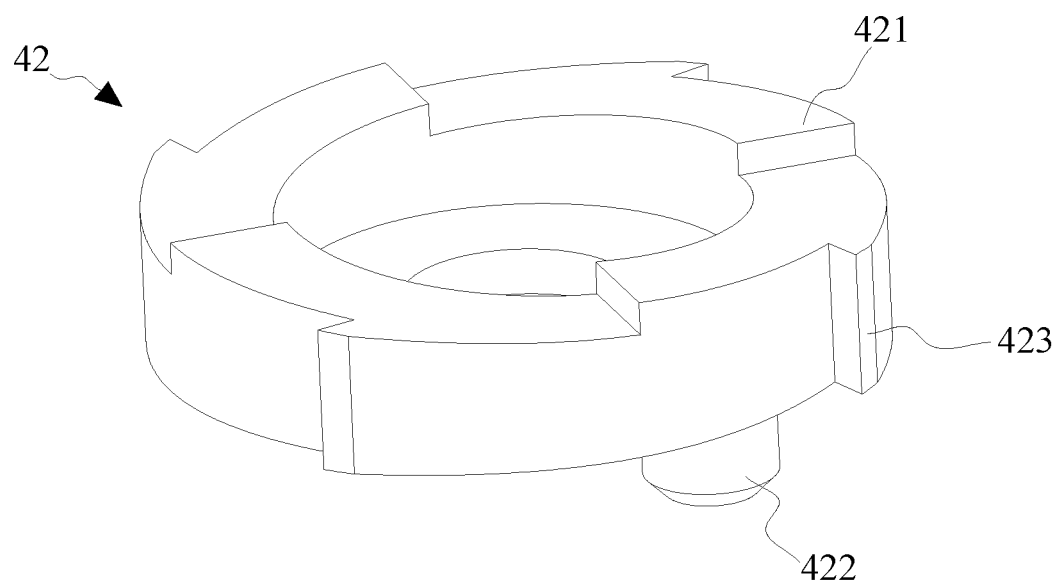
FIG. 10 is a schematic view of a driven wheel of the one-way rotational device of the waterway switching device in FIG. 1.

As shown in FIG. 8, the second water outlet 1016 and the water inlet 1014 may be partitioned when the switching shaft 2 moves to the third switching position, and the switching collar 21 moves between the second water outlet 1016 and the water inlet 1014, at this time, the first water outlet 1015 is opened, the second water outlet 1016 is closed, and the water flow in the water-division chamber 1017 may be output to the second water outlet chamber 1013 only from the first water outlet 1015, and flows out of the corresponding waterway 13.

It should be noted that during the above-mentioned movement of the switching shaft 2, the first sealing collar 22 always moves on the side of the first water outlet 1015 away from the water inlet 1014, and the second sealing collar 23 always moves on the side of the second water outlet 1016 away from the water inlet 1014, so as to prevent water leakage on the both ends of the water-division chamber 1017.

In other embodiments of the present disclosure, the switching shaft 2 may also perform switching between four or more switching positions, wherein at least one waterway 13 is opened correspondingly at each of the switching positions, which will be omitted herein.

Figure 2:
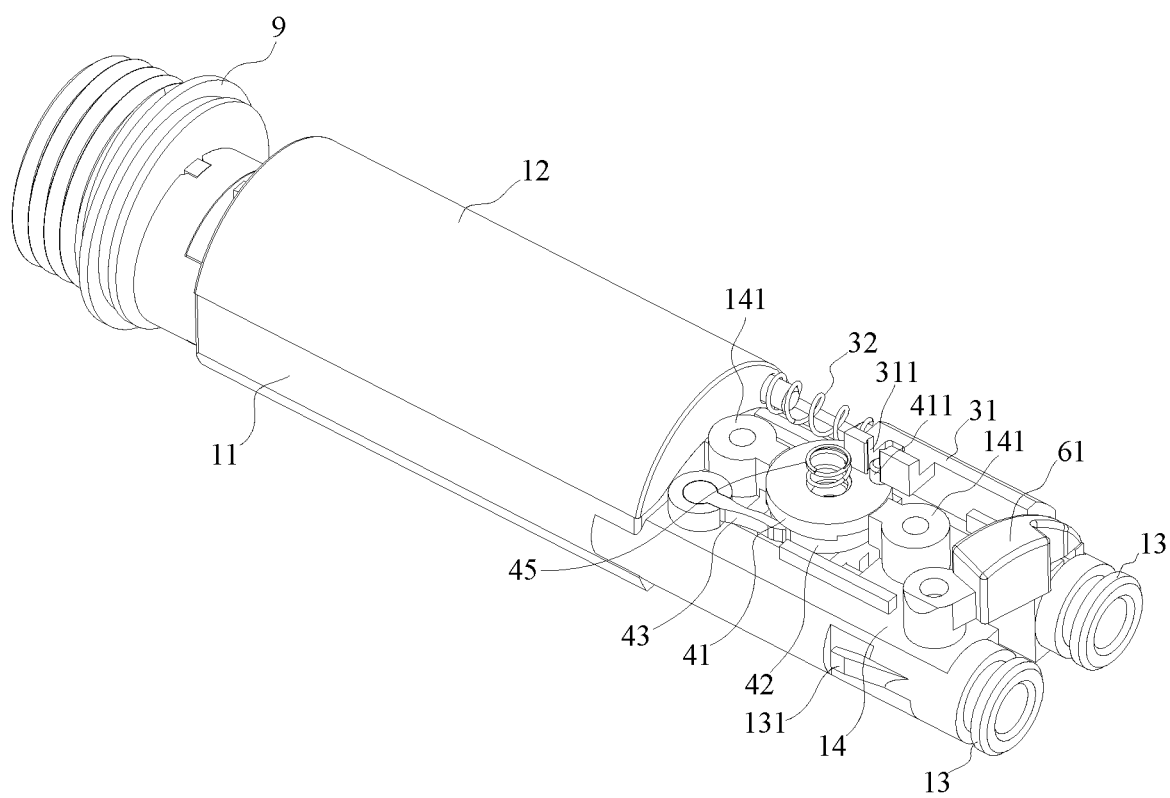
FIG. 2 is an assembling view of the waterway switching device in FIG. 1.

As shown in FIG. 1 and FIG. 2, in this embodiment, the driving mechanism may be disposed outside the water outlet end of the body 1, and may be disposed on the supporting portion 14 or directly disposed on the two water pipes, of course, may be partially disposed on the supporting portion 14, and the other part being disposed on two water pipes. The driving mechanism may include a reciprocating moving part 3, a one-way rotational device 4, a linkage member 5 and a driving member 6. The driving member 6 may drive the reciprocating movement of the reciprocating moving part 3. The reciprocating moving part 3 may drive one-way intermittent rotation of the one-way rotational device 4, so as to drive the reciprocating movement of the linkage member 5. The linkage member 5 is connected to the traction section of the switching shaft 2, thereby driving the reciprocating movement of the switching shaft 2, in which, As shown in FIG. 2, the reciprocating moving part 3 may include a slider 31 and a reset elastic member 32.

The slider 31 may be strip-shaped, and the supporting portion 14 may be provided with a guide rail parallel to the switching shaft 2, and the slider 31 may be slidably fitted on the guide rail and may reciprocate linearly along the guide rail. At the same time, a driving slot 311 may be opened on one side of the slider 31 near the switching shaft 2. Of course, the guide rails may also be disposed in other directions, and accordingly, the slider 31 may linearly reciprocate in other directions.

The reset elastic member 32 may be a spring, which may be disposed between the slider 31 and the water outlet end of the body 1. The reset elastic member 32 has one end abutting against the slider 31 and the other end abutting against the body 1, so that an acting force may be applied to the slider 31 away from the water outlet end in order to reset the slider 31. At the same time, the body 1 and the slider 31 may be provided with two opposite guide posts, and the spring may be sleeved outside the two guide posts to position the spring. Of course, the reset elastic member 32 may also be a rubber sleeve or other elastic members, which will be omitted herein.

As shown in FIG. 1 and FIG. 2, the one-way rotational device 4 may include a driving wheel 41, a driven wheel 42, a limit pawl 43, a gland 44, and a positioning elastic member 45.

As shown in FIG. 2 and FIG. 5, two positioners 141 may be formed on the supporting portion 14, located on the side of the slider 31 near the switching shaft 2, and respectively located on the two connectors of the supporting portion 14. A space between the two connectors may expose the traction section of the switching shaft 2. The driving wheel 41 may be disposed between the two positioners 141, and the outer circumference of the driving wheel 41 may be rotatably matched with the surface of the positioner 141. Meanwhile, an active deadbolt 411 may be provided on an upper surface of the driving wheel 41. The active deadbolt 411 may be eccentrically disposed, that is, disposed on one side of the center of the driven wheel 42 and may protrude into the driving slot 311. The slider 31 as reciprocating may drive the driving wheel 41 to make a reciprocating rotation within a preset angle by the active deadbolt 411, and the preset angle may be 90°, but not limited thereto, or may be other angle(s). In addition, an active ratchet 412 is provided on the lower surface of the driving wheel 41.

As shown in FIG. 2 and FIG. 5, the driven wheel 42 may be disposed under the driving wheel 41, and a driven ratchet 421 may be disposed on the upper surface of the driven wheel 42. The driven ratchet 421 is engaged with the active ratchet 412. The driving wheel 42 may be driven to rotate positively when the driving wheel 41 rotates in a positive direction, and the driven wheel 42 does not move when the driven wheel 41 rotates in a reverse direction, so that the driven wheel 42 may only rotate intermittently in one direction. The above-mentioned positive rotation may be counterclockwise rotation or clockwise rotation, which may be determined specifically by the structure of the driven ratchet 421 and the active ratchet 412, but not limited herein. At the same time, a driven deadbolt 422 may be disposed on the lower surface of the driven wheel 42. The driven deadbolt 422 may be eccentrically disposed, that is, disposed on one side of the center of the driven wheel 42. In addition, a limit ratchet 423 is provided at the periphery of the driven wheel 42.

As shown in FIG. 2, a limit pawl 43 may be disposed on the supporting portion 14 and positioned on the side of the driven wheel 42 away from the slider 31. The limit pawl 43 may cooperate with a limit ratchet 423, and a reverse rotation of the driven wheel 42 may be blocked by the limit pawl 43, thereby ensuring that the driven wheel 42 may rotate only in one direction.

As shown in FIG. 1 and FIG. 5, the gland 44 may be disposed above the driving wheel 41, and a positioning shaft 441 may be formed on the lower surface of the gland 44. The positioning shaft 441 may pass through the driving wheel 41 and through the driven wheel 42. Both the driving wheel 41 and the driven wheel 42 may rotate around the positioning shaft 441. At the same time, the gland 44 may be connected with the two positioners 141 of the supporting portion 14 by cooperation of screws, of course, the gland 44 may also be connected with the supporting portion 14 by other device, such as snapping.

As shown in FIG. 1 and FIG. 5, the positioning elastic member 45 may be a spring which may be sleeved outside the positioning shaft 441, and has one end abutting against the gland 44 and the other end abutting against the driving wheel 41. The gland 44 may apply a downward pressure to the driving wheel 41 by the spring to reset the driving wheel 41. The positioning elastic member 45 may also be other elastic members, such as a rubber sleeve, which will be omitted herein.

As shown in FIG. 1, FIG. 2, FIG. 4 and FIG. 5, the linkage member 5 may include a top end portion 51, a connecting portion, and a guiding portion.

The top end portion 51 may be a flat structure, which may be disposed under the driven wheel 42 and attached to the lower surface of the driven wheel 42. A traction groove 511 may be provided on the top end portion 51, into which the driven deadbolt 422 may be protruded. At the same time, the top end portion 51 may be located between the two supporting bodies of the supporting portion 14 and may be slidably fitted to or separated from the two supporting bodies.

The connecting portion may be disposed on the lower surface of the top end portion 51, and may be connected to the top end portion 51 in a snapping or bolting manner, and also may be an integral structure with the top end portion 51. At the same time, the connecting portion may include two claws 52. The traction section of the switching shaft 2 may be sandwiched between the two claws 52. Two snap slots 24 may be disposed at the periphery of the traction section, and may be symmetrically disposed with respect to a central axis of the switching shaft 2. The two claws 52 may be respectively snapped in the two snap slots 24 such that the traction section may be detachably connected with the connecting portion.

Figure 4:
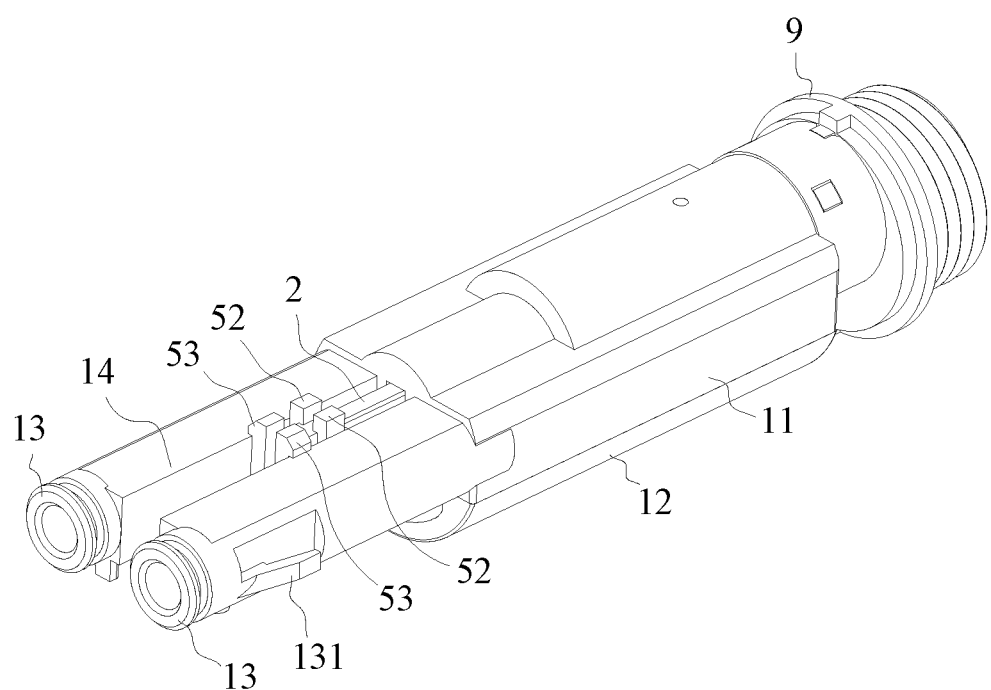
FIG. 4 is a schematic view of the bottom of the body of the waterway switching device in FIG. 1.

As shown in FIG. 4, the guiding portion may be provided on the lower surface of the top end portion 51, and also connected to the top end portion 51 in a snapping or bolting manner, or may be integrally formed with the top end portion 51. At the same time, the guiding portion is located on the side of the connecting portion away from the water outlet end, and has a gap with the connecting portion. The guiding portion may include two guide claws 53 that may pass down through the space of the two connecting body members of the supporting portion 14, wherein hooks extending outwardly are formed on the bottoms of the two guide claws 53, and the hooks of the two guide claws 53 are slidably fitted to the bottoms of the two supporting bodies of the supporting portion 14 correspondingly.

When the driven wheel 42 rotates in one direction, the top end portion 51 may reciprocally and linearly move by the driven deadbolt 422, so as to drive the reciprocating movement of the switching shaft 2 by cooperation of the connecting portion. If the preset angle of the rotation of the driving wheel 41 is 90°, an angle of the driven wheel 42 is 90°. When the driven wheel 42 is rotated by 90°, the driven deadbolt 422 of the driven wheel 42 drives the switching shaft 2 via the linkage member 5 to move by one switching position, for example, moving from the first switching position to the second switching position, or moving from the second switching position to the third switching position, or moving from the third switching position to the second switching position, and the like.

Figure 11:
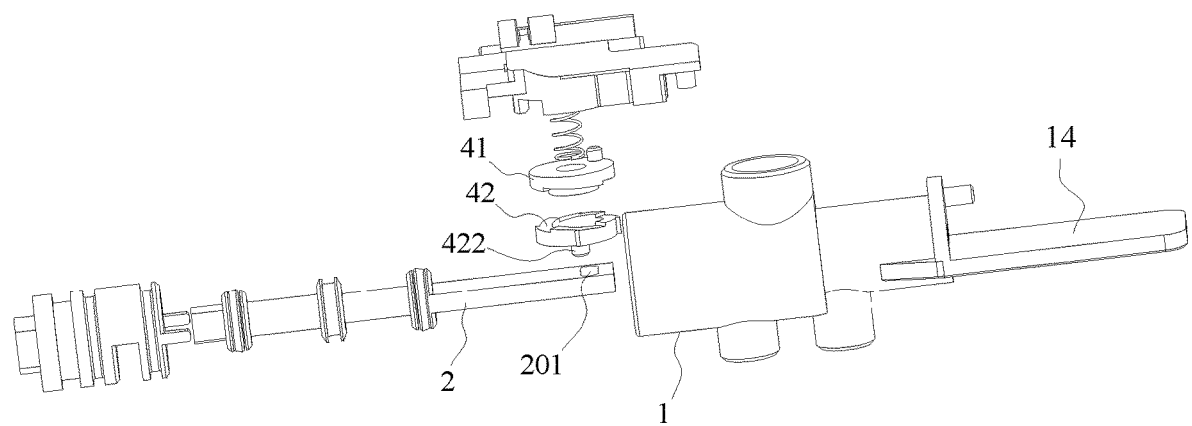
FIG. 11 is an exploded view of another embodiment of the waterway switching device of the present disclosure.
Figure 12:
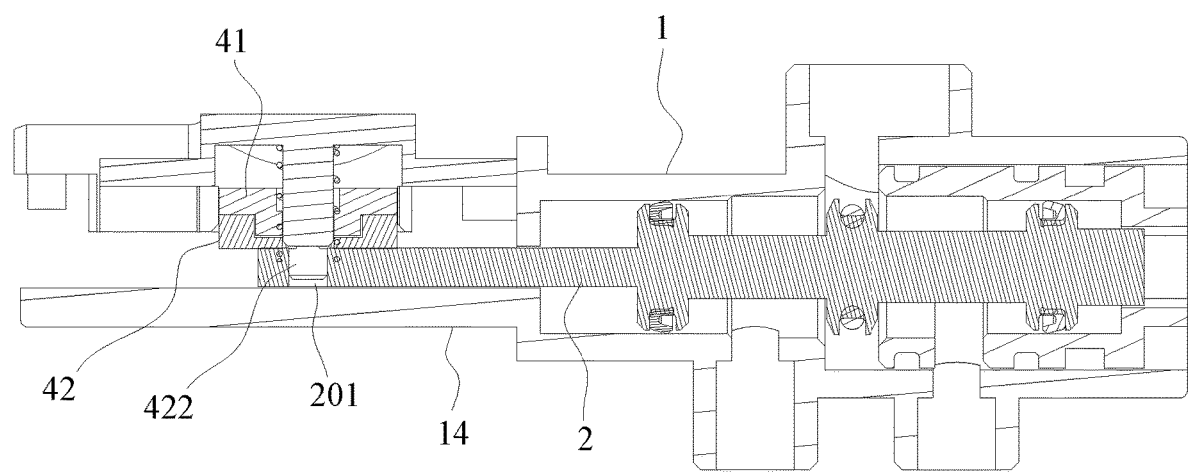
FIG. 12 is a cross-sectional view of the waterway switching device in FIG. 11.

In another embodiment of the present disclosure, the driving mechanism may not include the foresaid linkage member 5, as shown in FIG. 11 and FIG. 12, the traction section of the switching shaft 2 may be provided with a chute 201. The driven deadbolt 422 of the driven wheel 42 may be fitted and protruded into the chute 201, and may directly drive the switching shaft 2 to reciprocate when the driven wheel 42 rotates in one direction.

In other embodiments of the present disclosure, the driving wheel 41 may be a gear wheel, and the slider 31 may be a rack, and the gear wheel meshes with the rack. The slider 31 as reciprocating may also drive the driving wheel 41 to reciprocatingly swing. Thus, the above-mentioned active deadbolt 411 and driving slot 311 are not necessary to be used.

As shown in FIG. 2 and FIG. 12, in this embodiment, the driving member 6 may include a swing rod 61 and a press button 62.

The swing rod 61 has one end that may be hinged to the supporting portion 14 and the other end that may be in contact with one end of the slider 31 away from the water outlet end of the body 1. The slider 31 may be pushed to move toward the water inlet end by rotating the swing rod 61.

A press button 62 may be hinged to the supporting portion 14 or may be hinged to the handle 7. The swing rod 61 may be rotated by pressing the press button 62 to push the slider 31 to move. When the waterway switching device of this embodiment is applied to the handle 7 of the shower head, the press button 62 may be disposed at a joint of the nozzle 8 and the handle 7 and exposed outside, and the user only needs to press the press button 62 to move the switching shaft 2, such that switching of the waterway 13 can be achieved.

In another embodiment, the driving member 6 may also be a push button. The push button may be slidably connected to the body 1, and may be connected to the slider 31 and may be movable synchronously with the slider 31. When the waterway switching device of this embodiment is applied to the handle of the shower head, the handle may open an opening, such that the push button may protrude into the opening and may be slidable within the opening, and the user only needs to trigger the push button to move the switching shaft 2, such that switching of the waterway 13 can be achieved.

In other embodiments of the present disclosure, the driving member 6 may also be other structures as long as the slider 31 may be driven to move toward the water inlet end, which will be omitted herein. Alternatively, the driving wheel 41 may be directly driven to rotate by the driving member 6, and the reciprocating moving part 3 may be omitted.

In the embodiments of the present disclosure, the driving wheel 42 and the driven wheel 41 are rotated to move the switching shaft 2, which may ensure the same switching force of the switching shaft 2, avoid quick return phenomenon caused by using the mechanism, such as a crank slider, and avoid lost motion of an automatic transmission mechanism, and the user only needs to press the press button 62 to achieve switching of the waterway.

The waterway switching device according to the exemplary embodiment of the present disclosure may drive the one-way rotational device 4 by the driving member 6 to reciprocate the linkage member 5, thereby reciprocating the switching shaft 2, so that the switching shaft 2 is switched between at least two switching positions, and thereby opening at least one waterway 13 to direct the water flow through. During this process, the one-way rotational device 4 may convert the one-way rotation into the reciprocating movement of the switching shaft 2, and the switching force as required for each one-way rotation is uniform, so that the user feels the switching operation in consistent, to avoid sudden change of the switching force and make the operation more comfortable.

Figure 13:
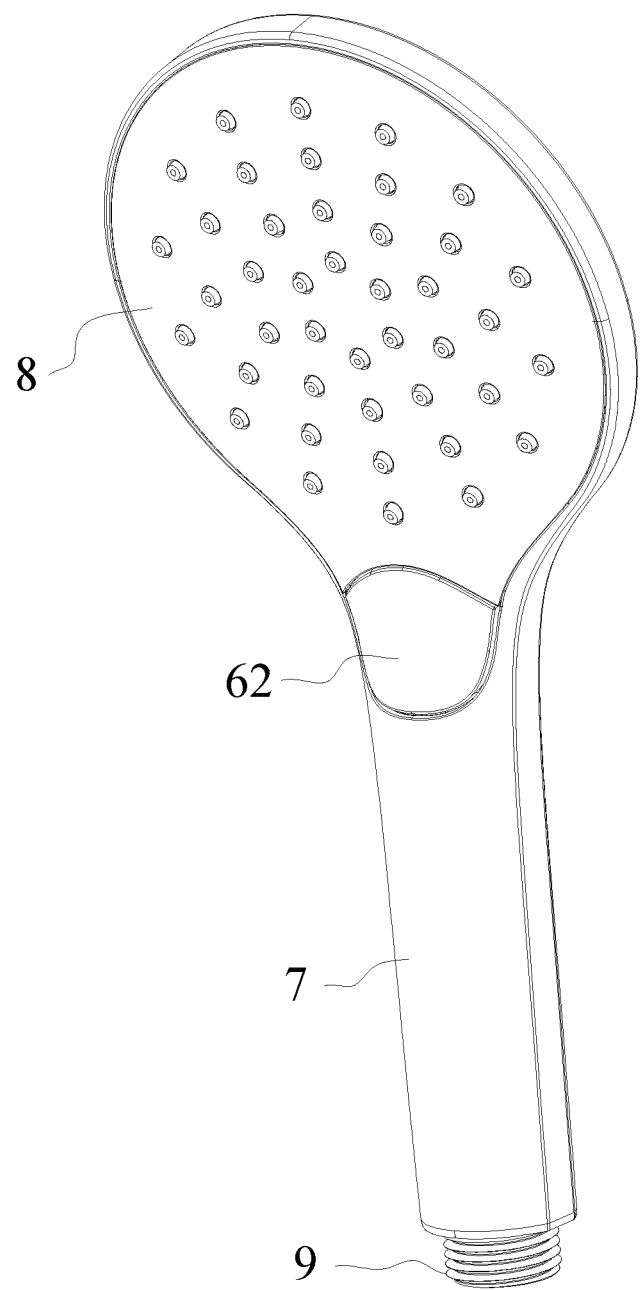
FIG. 13 is a schematic view of a thin shower head according to an embodiment of the present disclosure.
Figure 14:
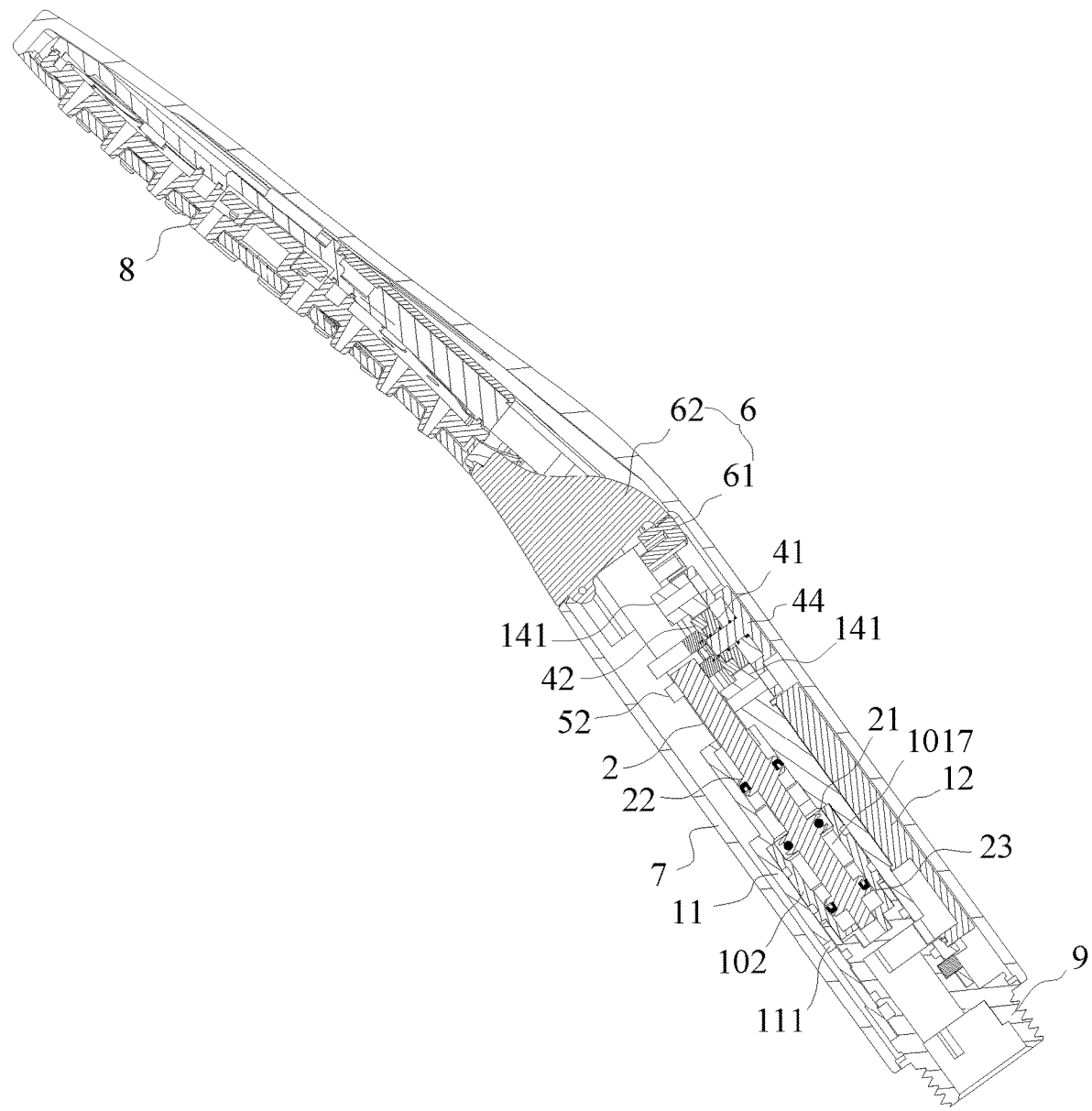
FIG. 14 is a schematic view showing an internal structure of the thin shower head according to an embodiment of the present disclosure.

As shown in FIG. 13 and FIG. 14, the embodiment of the present disclosure further provides a thin shower head. The thin shower head of this embodiment may include a handle 7 and a nozzle 8. The handle 7 has one end connected to the nozzle 8 and the other end provided with a joint 9. The joint 9 may be in communication with a water inlet pipe. The waterway switching device according to any one of the above embodiments may be provided in the handle 7. Wherein two waterways 13 may be in communication with the nozzle 8.

The exemplary embodiment of the present disclosure provides a thin shower head, in which the waterway switching device in the above embodiments is installed in the handle 7 of the shower head, which may fully utilize the internal space of the handle 7, to avoid setting the switching device in the nozzle 8 of the shower head, in order to reduce the size of the nozzle 8 and not need to increase the size of the handle 7. At the same time, the waterway switching device is installed in the handle 7 of the shower head, which may separate the waterway switching device from the structure in the nozzle 8 in order to facilitate for separate replacement or maintenance.

According to the above-described technical solutions, the present disclosure has at least one of the following advantages and positive effects:

In the waterway switching device of the present disclosure, the one-way rotational device is driven by the driving member to reciprocate the linkage member, thereby reciprocating the switching shaft, so that the switching shaft is switched between at least two switching positions, and thereby opening at least one waterway to direct the water flow through. During this process, the one-way rotational device may convert the one-way rotation into the reciprocating movement of the switching shaft, and the switching force as required for each one-way rotation is uniform, so that the user feels the switching operation in consistent, to avoid sudden change of the switching force and make the operation more comfortable.

In the thin shower head of the present disclosure, the waterway switching device is installed in the handle of the shower head, which may fully utilize the internal space of the handle, to avoid setting the switching device in the nozzle of the shower head, in order to reduce the size of the nozzle to make the nozzle thinner and not need to increase the size of the handle. At the same time, the waterway switching device is separated from the structure in the nozzle in order to facilitate for separate replacement or maintenance.

It should be understood that this disclosure would never be limited to the detailed construction and arrangement of components as set forth in this specification. This disclosure has other embodiments that can be practiced or carried out in various ways. The foregoing variations and modifications fall within the scope of this disclosure. It should be understood that this disclosure would contain all alternative combination of two or more individual features as mentioned or distinct from in the text and/or in the drawings. All of these different combinations constitute a number of alternative aspects of this disclosure. The embodiments as illustrated in this specification are the best modes known to achieve this disclosure and will enable one skilled in the art to realize this disclosure.

What is claimed is:

1. A waterway switching device, comprising:
    a body having a hollow portion and a water inlet end and a water outlet end, in which at least two waterways in communication with the hollow portion are provided at the water outlet end;
    a switching shaft disposed in the body and comprising a water-division section located in the hollow portion and a traction section extending out of the water outlet end; and
    a driving mechanism disposed outside the body and configured to drive the switching shaft to reciprocate in an axial direction, such that the switching shaft is switched between at least two switching positions, wherein at least one waterway is opened correspondingly at each of the switching positions;
    the driving mechanism comprising a driving member and a one-way rotational device for connecting the driving member to the switching shaft,
    wherein the waterway switching device further comprises a reciprocating moving part, and the driving member is connected to the one-way rotational device by the reciprocating moving part,
    wherein the one-way rotational device comprises:
    a driving wheel that is connected to the reciprocating moving part and can be swung by driving of the reciprocating moving part, and an active ratchet being provided on a lower surface of the driving wheel; and
    a driven wheel disposed under the driving wheel, and a driven ratchet engaged with the active ratchet being disposed on an upper surface of the driven wheel, in which the driven wheel is rotated in one direction along with the rotation of the driving wheel, thereby driving the switching shaft to reciprocate,
    wherein the waterway switching device further comprises a linkage member for connecting the one-way rotational device and the traction section, the linkage member comprises:
    a top end portion disposed under the driven wheel, in which a traction groove is defined in the top end portion, and a driven deadbolt protruded and fitted into the traction groove is provided on a lower surface of the driven wheel; and the driven wheel can drive the linkage member to reciprocate by cooperation of the driven deadbolt and the traction groove; and
    a connecting portion connected to the top end portion and the traction section.

2. The waterway switching device according to claim 1, wherein the at least two waterways are formed by at least two separate water pipes.

3. The waterway switching device according to claim 2, wherein the driving mechanism is disposed on the at least two separate water pipes.

4. The waterway switching device according to claim 2, wherein a supporting portion is formed on the water outlet end of the body, and the driving mechanism is disposed on the supporting portion.

5. The waterway switching device according to claim 1, wherein the one-way rotational device further comprises:
    a limit pawl disposed on the supporting portion, and a limit ratchet being provided at a periphery of the driven wheel, in which the limit pawl cooperates with the limit ratchet to block a reverse rotation of the driven wheel.

6. The waterway switching device according to claim 1, wherein the driven wheel is connected to the traction section, and the one-way rotational device further comprises:
    a gland disposed above the driving wheel and connected to the supporting portion; and
    a positioning elastic member disposed between the gland and the driving wheel, configured to apply a downward force to the driving wheel.

7. The waterway switching device according to claim 1, wherein the reciprocating moving part comprises:

a slider disposed on the supporting portion and capable to reciprocate linearly, in which the slider is defined with a driving slot, and an active deadbolt protruded and fitted into the driving slot is provided on an upper surface of the driving wheel, and the slider can drive the driving wheel to reciprocate with a preset angle by cooperation of the driving slot and the deadbolt.

8. The waterway switching device according to claim 7, wherein the reciprocating moving part further comprises:
a reset elastic member disposed between the slider and the water outlet end, configured to apply a force to the slider away from the water outlet end.

9. The waterway switching device according to claim 7, wherein the preset angle is 90°.

10. The waterway switching device according to claim 7, wherein the driving member comprises:
a swing rod having one end hinged to the supporting portion and the other end in contact with one end of the slider away from the water outlet end; and
a press button that can be hinged to the body and press the swing rod to drive the slider toward the water outlet end.

11. The waterway switching device according to claim 7, wherein the driving member is a push button, and the push button is slidably connected to the body, and the push button is connected to the slider and is synchronously movable.

12. The waterway switching device according to claim 1, wherein the connecting portion comprises two claws; two snap slots symmetrically distributed are provided at the periphery of the traction section; and the two claws are engaged in the two snap slots.

13. The waterway switching device according to claim 1, wherein the linkage member further comprises a guiding portion, in which the guiding portion is connected to the top end portion and located on one side of the connecting portion away from the water outlet end; the guiding portion comprises two guide claws which are slidably matched with the supporting portion.

14. A thin shower head, comprising a handle and a nozzle positioned on one end of the handle, wherein the handle is provided with a waterway switching device, wherein the waterway switching device comprises:
a body having a hollow portion and a water inlet end and a water outlet end, in which at least two waterways in communication with the hollow portion are provided at the water outlet end;
a switching shaft disposed in the body and comprising a water-division section located in the hollow portion and a traction section extending out of the water outlet end; and
a driving mechanism disposed outside the body and configured to drive the switching shaft to reciprocate in an axial direction, such that the switching shaft is switched between at least two switching positions, wherein at least one waterway is opened correspondingly at each of the switching positions;
the driving mechanism comprising a driving member and a one-way rotational device for connecting the driving member to the switching shaft;
wherein the waterway switching device further comprises a reciprocating moving part, and the driving member is connected to the one-way rotational device by the reciprocating moving part,
wherein the one-way rotational device comprises:
a driving wheel that is connected to the reciprocating moving part and can be swung by driving of the reciprocating moving part, and an active ratchet being provided on a lower surface of the driving wheel; and
a driven wheel disposed under the driving wheel, and a driven ratchet engaged with the active ratchet being disposed on an upper surface of the driven wheel, in which the driven wheel is rotated in one direction along with the rotation of the driving wheel, thereby driving the switching shaft to reciprocate,
wherein the waterway switching device further comprises a linkage member for connecting the one-way rotational device and the traction section, the linkage member comprises:
a top end portion disposed under the driven wheel, in which a traction groove is defined in the top end portion, and a driven deadbolt protruded and fitted into be traction groove is provided on a lower surface of the driven wheel; and the driven wheel can drive the linkage member to reciprocate by cooperation of the driven deadbolt and the traction groove; and
a connecting portion connected to the top end portion and the traction section,
wherein the at least two waterways is in communication with the nozzle.

* * * * *